(12) United States Patent
Wilhelm

(10) Patent No.: US 6,269,553 B1
(45) Date of Patent: Aug. 7, 2001

(54) DRYING APPARATUS FOR THE DRYING OF BULK MATERIAL

(75) Inventor: Klaus Wilhelm, Rosenheim (DE)

(73) Assignee: Klaus Wilheim (DE)

(*) Notice: Subject to any disclaimer, the term of this patent is extended or adjusted under 35 U.S.C. 154(b) by 0 days.

(21) Appl. No.: 09/421,001

(22) Filed: Oct. 20, 1999

(30) Foreign Application Priority Data

Oct. 20, 1998 (DE) .............................................. 198 48 140

(51) Int. Cl.[7] .................................................. F26B 17/00
(52) U.S. Cl. .................................................. 34/579; 34/583
(58) Field of Search .............................. 34/372, 80, 576, 34/579, 583, 584, 585; 96/108, 202, 351

(56) References Cited

U.S. PATENT DOCUMENTS

| | | | |
|---|---|---|---|
| 3,600,818 | * 8/1971 | Lang | 34/579 |
| 3,818,606 | * 6/1974 | Marcellini | 34/579 |
| 4,349,969 | * 9/1982 | Stewart et al. | 34/579 |
| 4,413,426 | 11/1983 | Graff . | |
| 4,509,272 | 4/1985 | Graff . | |
| 4,561,192 | * 12/1985 | Meade | 34/579 |
| 4,606,896 | * 8/1986 | Kita et al. | 34/579 X |
| 4,628,831 | * 12/1986 | Delessard et al. | 34/579 |
| 5,391,356 | * 2/1995 | Thorman | 34/585 |
| 5,420,404 | * 5/1995 | Goodman et al. | 34/250 X |
| 5,513,445 | 5/1996 | Farrag . | |
| 5,566,468 | * 10/1996 | Graeff | 34/80 |
| 6,058,623 | * 5/2000 | Brooks et al. | 34/362 |

FOREIGN PATENT DOCUMENTS

| | | |
|---|---|---|
| 33 20 978 A1 | 12/1983 | (DE) . |
| 3131471 | 6/1990 | (DE) . |
| 43 00 595 A1 | 7/1994 | (DE) . |
| 296 21 313 U1 | 3/1997 | (DE) . |
| 0 061 161 | 7/1985 | (EP) . |
| 2 122 384 | 1/1984 | (GB) . |

OTHER PUBLICATIONS

Brochure; Motan Trockner; p. 4;1979.
Brochure; Drying With Motan; Motan Plast–Automation: Everything for Commercial Efficiency in Technical Plastic Production; p. 4; 1983.

* cited by examiner

*Primary Examiner*—Stephen Gravini
(74) *Attorney, Agent, or Firm*—Nixon & Vanderhye PC

(57) ABSTRACT

In the case of a drying apparatus for the drying of bulk material, more especially synthetic resin granules or powder, the volume flow rate setting means (11) comprises at least two flow through off/on means, which are arranged in at least two duct branches (22), connected in parallel, of the gas supply duct (10) and are able to be switched over by the switching and regulation means (2) between an opened and a closed position so that the drying gas volume flow introduced into the receiving space (3) is set by the number and/or selection of the opened flow off/on means.

5 Claims, 2 Drawing Sheets

DRYING APPARATUS FOR THE DRYING OF BULK MATERIAL

BACKGROUND OF THE INVENTION

The invention relates to a drying apparatus for the drying of bulk material, more particularly synthetic resin granules or powder.

It is more especially in the synthetic resin processing industry that it is frequently necessary for raw materials in the form of granules, powder or in a similar bulk condition to be dried, before same are for example processed in an injection molding machine or in an extruder. For this purpose hot gas driers are known, in the case of which the gas employed for drying is heated prior to the drying operation to a temperature specific to the synthetic resin and the hot gas is then passed through the material to be dried.

In order to ensure effective drying of the material to be dried on the one hand while at the same time avoiding unnecessary waste of energy on the other hand it is necessary to hold the drying gas flowing through the material at a predetermined temperature within the drying container. For this purpose switching and regulating means are known, which find the temperature at the outlet of the drying container by means of a temperature sensor, which is connected by means of a capillary tube connection with a thermostat (or flow rate control valve) arranged in the gas supply duct. In the event of the temperature increasing at the outlet of the drying container, for example because a trouble condition has occurred, and the heated synthetic resin material is no longer removed from the drying container, the thermostat reduces the passage of gas to the drying container. If the gas outlet temperature falls below a predetermined value, the gas volume flow rate to the drying container will be increased.

It is however a disadvantage in this respect that thermostat-operated valves capable of operating precisely are extremely expensive and consequently do not come into question for small drying plant. In the case of known drying plant use is consequently usually made of cheap but extremely inaccurate thermostat-driven valves for volume flow rate regulation of the drying gas. A further disadvantage is that thermostat-operated regulation valves, which are connected via a capillary tube connection with the temperature sensor, respond with a long time lag to changes in temperature. A rapid correction of the gas volume flow rate is therefore not possible. More particularly in the case of small drying gas volume flow rates of below 1000 1/min the known thermostat regulation means react slowly and thus lead to inaccurate process control. A still further disadvantage is that using conventional thermostat regulation means it is not possible to select any drying gas flows specific to the material to be dried, i.e. to use different drying programs, as they are for example necessary of different types of synthetic resin, such as ABS or PET.

SUMMARY OF THE INVENTION

Accordingly one object of the invention is to provide a drying apparatus of the type initially mentioned, with which the rate of the drying gas volume flow to be introduced into the drying container may be set in an extremely accurate, rapid and furthermore simple and economic manner.

In accordance with the invention the volume flow rate setting means comprises at least two flow off/on means which are arranged in at least two parallel-connected branch duct of the gas supply ducts are able to be switched over by the switching and regulation means between an opened and a closed position so that the drying gas volume flow introduced into the receiving space is set by the number and/or selection of the opened flow off/on means.

The drying apparatus in accordance with the invention preferably comprises a multi-duct intermediate member in the gas supply duct, there being a flow off/on means, for example in the form of a solenoid valve, arranged in each branch duct. These flow off/on means are only able to be switched over between an opened and a closed position and may hence be extremely simple in design and therefore low in price. The volume flow rate of the drying gas introduced into the drying container accordingly is set by how many and/or which of these flow off/on means are opened. A further way of varying the volume flow is due to the fact that flow through off/on means in accordance with an advantageous embodiment of the invention have through flow openings or lumens of different size. If for instance four parallel-connected solenoid valves with different sizes of flow through opening are used it is possible have 15 different switching combinations to produce 15 different drying gas volume flow rates (beside the zero flow rate, for which all valves are closed).

In lieu of solenoid valves it is possible as well to design the flow off/on means in some other manner, for example in the form of sliding plates or gate valve An other preferred feature of the invention is such that the switching and regulation means is mounted together with the through flow off/on means in a removable manner on the drying container. This offers the advantage that different drying containers, which are best suited for certain materials, may be combined with a predetermined switching and regulation means.

In accordance with a further preferred development of the invention different drying programs are stored in the switching and regulation means, with which programs predetermined combinations of opened and closed flow through off/on means may be selected. This offers the advantage that for different materials to be dried, and more especially for different sorts of synthetic resin, specific optimally adapted volume flow rate programs may be run.

BRIEF DESCRIPTION OF THE DRAWINGS

An example of the invention will now be described in detail with reference to the accompanying drawings.

DETAILED DESCRIPTION OF THE INVENTION

Figure 1:
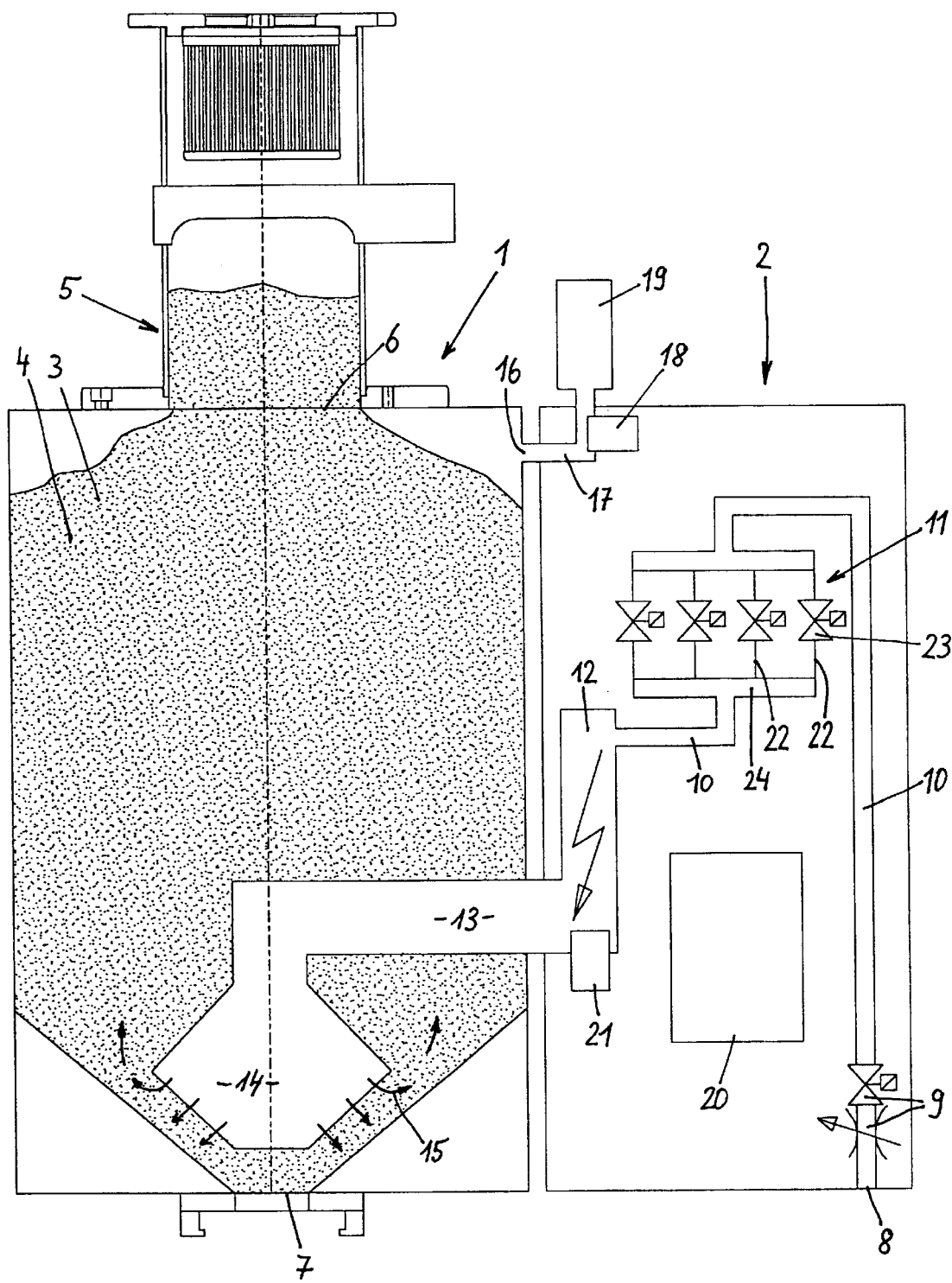
FIG. 1 is a diagrammatic representation of the drying apparatus of the invention, the switching and regulation means being fixed on the drying container

FIG. 1 shows a drying apparatus, which essentially comprises a drying container 1 and a switching and regulation means 2.

The drying container 1 possesses an internal receiving space 3 for receiving bulk material 4, as for example synthetic resin or plastic granules or synthetic resin powder. The material 4 may be introduced in a known fashion via a conveying device 5, mounted on the drying container 1, and a material inlet opening 6, provided on the top side of the drying container 1, into the receiving space 3.

At the bottom of the drying container 1 a material outlet opening 7 is present, through which the material 4 may be removed from the receiving space 3 downward. For instance it is possible to mount the drying apparatus on a plastic injection molding machine or on an extruder in such a manner that the material 4 is passed from the material outlet opening 7 into the machine for further processing or a corresponding material conveying duct.

The drying of the material 4 within the drying container 1 takes place using a heated drying gas, and more especially by means of heated air. For this purpose the switching and regulation means 2 has a compressed air connection 8, which may be connected with a conventional compressed air distribution system. By means of a following inlet and pressure reducing valve 9 the high pressure, as present in the compressed air system of for example 7 bar, is reduced to the operating pressure required for the drying apparatus.

From the inlet and pressure reducing valve 9 the gas flows through a gas supply duct 10 and a downstream volume flow setting means 11, described in detail, to a heating means 12, where the air is heated up to a temperature of for example 100° to 150° C. The temperature to which the gas is heated is dependent on the material to be dried and may be varied. As a heating means 12 it is possible to employ conventional known heating means, as for instance electrical heating means or heating means employing superheated steam.

In the case of the illustrated working example the heating means 12 is arranged within the switching and regulation means 2. It is however quite possible to arrange the heating means 12 outside the switching and regulation means 2, as for instance between the latter and the drying container 1.

From the heating means 12 the heated drying gas flows into an air distributor duct 13, which extends from the outer wall of the drying container 1 as far as the vertical center axis of the drying container 1. The air distributor cone 14 is located in a region of the drying container 1 near the bottom thereof and possesses perforated outer walls so that the drying air may leave in the direction of the arrows 15 and flow through the material 4 upward. The material 4 is thus dried.

In the top region of the drying container 1 an outlet 16 is provided, through which the drying gas is removed from the receiving space 3 again. From the outlet 16 of the drying container 1 a gas outlet duct 17 leads back into the switching and regulation means 2. In the gas outlet duct 17 there is an outlet temperature sensor 18 for the emerging drying gas. At the end of gas outlet duct 17 there is a filter 19, via which the drying gas is either let off into the atmosphere or is supplied via a suitable return duct (not illustrated) back into the gas supply duct 10.

The temperature within the drying container 1 is set or adjusted by setting the drying gas volume flow rate, such gas flowing via the gas supply duct 10 to the drying container 1. For regulation of the drying gas volume flow rate a processor 20 is provided in the switching and regulation means 2, such processor acting as a temperature regulating means, it cooperating with the outlet temperature sensor 18 and the volume flow setting means 11. The volume flow rate is set in a manner dependent on the temperature, measured by the outlet temperature sensor 18, of the discharged drying gas. If the temperature is too low, the processor 20 acts on the volume flow rate setting means 11 in such a manner that the volume flow rate of the drying gas is increased. If the outlet temperature is too high the volume flow rate is correspondingly reduced. For this purpose the gas supply duct 10 is divided at the volume flow rate setting means 11, in the illustrated working example, into four branch ducts 22, which are set in parallel, in which in each case a flow off/on means is located in the form of a solenoid valve 23. The solenoid valves 23 may open or close the flow of the drying gas through the respective branch duct 22. The individual branch ducts 22 open downstream from the solenoid valve 23 into the common gas supply duct 10 in order to supply the gas to the heating means 12.

The solenoid valves 23 can be switched over by the processor 20 individually between their on and off settings. As will be apparent the volume flow rate of the gas, which is supplied to the drying container 1, is dependent on how many solenoid valves are open. In the event of all four solenoid valves 23 being closed, the gas supply to the drying container 1 is completely shut off. If all four solenoid valves 23 are opened, the gas volume supply rate is at a maximum. If the solenoid valves 23 have flow openings or lumens of equal size, it is then possible to set to four different volume flow rates.

A further possibility for variation for the setting of the rate of volume flow is for the solenoid valves 23 and/or the branch ducts 22 to have different lumens. In the case of such a design (including the completely closed state) there will be $2^4=16$ different gas volume flow rates. The size of the gas volume flow rate will consequently be dependent in this case not only on the number of opened solenoid valves 23 but also on which solenoid valves 23 are opened and which are closed.

In the switching and regulation means 2, i.e. in the processor 20, different drying programs are stored, with which predetermined combinations of opened and closed solenoid valves 23 can be selected. This means that it is possible to select specific gas volume flow rates even as a preliminary for the material to be dried and to hold the rate constant dependent on the continuity of the rate at which the material is passed through or for example in the case of an interruption to increase or reduce the gas volume flow rate.

The target temperature for the drying gas is set in a manner specific for the material to be dried using an input temperature sensor 21 in connection with the processor 20. By means of the outlet temperature sensor 18 deviations from the target outlet temperature are detected and the gas volume flow rates are corrected in a manner specific for the program.

Figure 2:
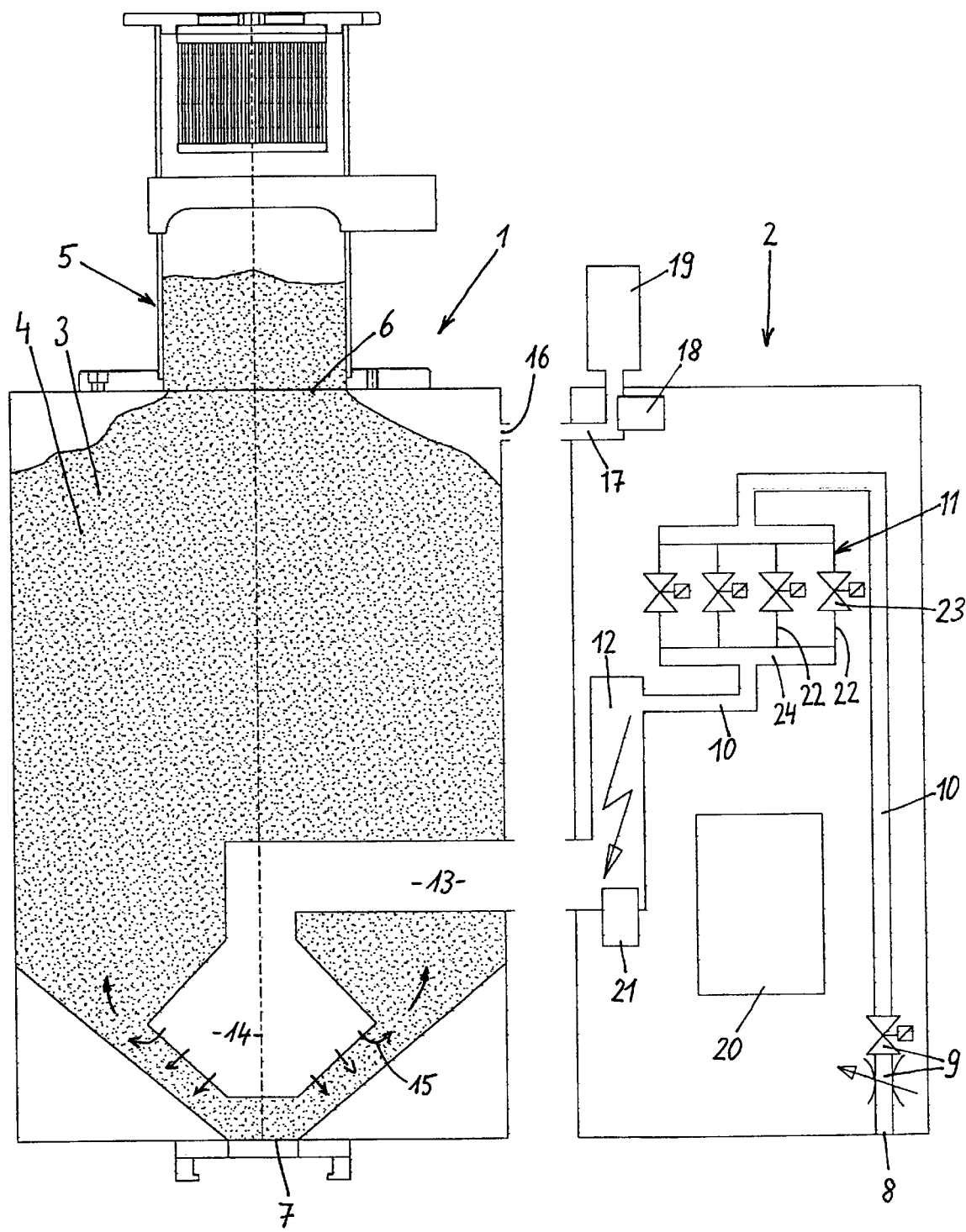
FIG. 2 shows an alternative embodiment of the drying apparatus in accordance with the invention, the switching and regulation means being able to be detached from the drying container.

FIG. 2 shows an alternative working embodiment on the drying apparatus in accordance with the invention. This embodiment is substantially identical to that of FIG. 1. The sole difference is that the switching and regulation means 2 is mounted in a removable manner on the drying container 1. For this purpose releasable coupling elements (not illustrated in detail) are provided on the drying container 1 and on the switching and regulation means 2 for the gas supply duct 10 and the gas outlet duct 17. The coupling elements are preferably so designed that an extremely rapid and simple coupling and detachment of the switching and regulation means 2 to and from the drying container 1 is possible.

What is claimed is:

1. A drying apparatus for the drying of bulk material, comprising a drying container having a receiving space for the material to be dried, a gas supply duct for the introduction of drying gas into the drying container, an outlet for the removal of the supplied drying gas, and a switching and regulation system for the regulation of the drying gas volume flow rate to be supplied by a volume flow rate setting assembly arranged along the gas supply duct wherein the gas supply duct comprises at least two parallel branch ducts the volume flow rate setting assembly comprising at least two flow off/on components which are arranged respectively in said at least two parallel-connected branch ducts of the gas supply duct said at least two parallel-connected branch ducts being joined downstream from said flow on/off components to define a single, common gas supply duct for supplying the gas into the heating means, each said flow off/on components being adapted to be selectively switched over by the switching the regulation system between an opened position and a closed position so that the drying gas volume flow rate into the receiving space is set by at least one of a number and selection of the opened flow off/on components.

2. The drying apparatus as set forth in claim 1, wherein the flow off/on components comprise solenoid valves.

3. The drying apparatus as set forth in claim 1, wherein the flow off/on components each have lumens of different sizes.

4. The drying apparatus as set forth in claim 1, wherein the switching and regulation system is detachably mounted on the drying container together with the flow through off/on components.

5. The drying apparatus as set forth in claim 1, wherein a plurality of different drying programs are stored in the switching a regulation system, whereby predetermined combinations of opened and closed flow through off/on components may be selected.

\* \* \* \* \*